United States Patent [19]
Kithil

[11] Patent Number: 5,602,734
[45] Date of Patent: *Feb. 11, 1997

[54] AUTOMOBILE AIR BAG SYSTEMS

[75] Inventor: Philip W. Kithil, Santa Fe, N.M.

[73] Assignee: Advanced Safety Concepts, Inc., Santa Fe, N.M.

[*] Notice: The term of this patent shall not extend beyond the expiration date of Pat. No. 5,366,241.

[21] Appl. No.: 311,576

[22] Filed: Sep. 23, 1994

[51] Int. Cl.$^6$ ............................................. B60R 21/32
[52] U.S. Cl. .................... 364/424.055; 340/669; 307/10.1; 280/735; 180/282
[58] Field of Search ................ 364/424.05; 340/436, 340/669; 307/10.1; 280/734, 735; 180/274, 282

[56] References Cited

U.S. PATENT DOCUMENTS

| | | | |
|---|---|---|---|
| 3,473,824 | 10/1969 | Carey et al. | 280/729 |
| 3,664,682 | 5/1972 | Wycech | 280/729 |
| 3,752,501 | 8/1973 | Daniel et al. | 280/729 |
| 3,774,936 | 11/1973 | Barnett et al. | 280/730.1 |
| 3,864,668 | 2/1975 | Bickford | 180/270 |
| 3,894,750 | 7/1975 | Eckels | 280/730.1 |
| 3,898,472 | 8/1975 | Long | 180/270 |
| 3,900,210 | 8/1975 | Lohr et al. | 280/729 |
| 3,917,023 | 11/1975 | De Rosa | 280/735 |
| 3,949,357 | 4/1976 | Hosaka | 180/274 |
| 3,964,016 | 6/1976 | Yamada et al. | 180/274 |
| 4,006,918 | 2/1977 | MacFarland | 280/729 |
| 4,130,298 | 12/1978 | Shaunnessey | 280/729 |
| 4,166,641 | 9/1979 | Okada et al. | 280/735 |

(List continued on next page.)

OTHER PUBLICATIONS

Smythe, "Static and Dynamic Electricity" (1950), p.38
Novak & Fedemme, A Capacitance–Based Proximity Sensor For Whole Arm Obstacle Avoidance, Proc'ings of 1992 IEEE Conf., pp. 1307–1311.
D. S. Breed et al, "A Complete Frontal Crash Sensor System—1", Mar. 1993, SAE Rept. 930650, pp. 119–125, 131–132.
Information Disclosure Statement For Applicant's U.S. Patent Application No. 08/130089.
D. S. Breed et al, "A critique of single point sensing ", SAE Int'l Report No. 920124, Feb. 1992, p. 51.
PARS Document, Author & Date Unknown.
D. S. Breed et al, "A complete frontal crash sensor system—1", SAE Int'l Report No. 930650, Mar. 1993, pp. 119–121, 124–132.

*Primary Examiner*—Kevin J. Teska
*Assistant Examiner*—Tyrone V. Walker
*Attorney, Agent, or Firm*—Robert W. Harris

[57] ABSTRACT

A roof-mounted air bag system, having a passenger position sensor array of capacitive coupling passenger position sensors, to determine position and motion of a passenger by triangulation, from microprocessor analysis of distances of the passenger to the various sensors of the array and analysis of the changes of said distances with time; the combination of a three-axis vehicle rollover sensor and microprocessor analysis of the output of said sensor, to both block air bag deployment in the event that said sensor output indicates a vehicle rollover, and also confirm a crash event by sensing rapid angular vehicle acceleration; a microprocessor to analyze signals from the passenger position sensor array, and from the rollover sensor, and to order air bag deployment when it would be helpful but not otherwise; an air bag with an inflated configuration having two principal chambers, one inflating downward along the windshield and the other inflated to the rear of the first, with a reentrant slot-shaped space between them which can accommodate a forwardly positioned passenger, such as an infant in a rear facing car seat, which inflation configuration can reduce the likelihood of injury to said passenger resulting from the air bag deployment; and means in the microprocessor for brief recording of passenger motion data from the passenger position sensor array, by the microprocessor, for possible later use in crash analysis, which may lead to ideas for improvement of design of the vehicle or air bag system.

23 Claims, 3 Drawing Sheets

U.S. PATENT DOCUMENTS

| | | | |
|---|---|---|---|
| 4,169,613 | 10/1979 | Barnett | 280/739 |
| 4,345,914 | 8/1982 | Livers et al. | 280/735 |
| 4,536,008 | 8/1985 | Brown, Jr. | 280/736 |
| 4,573,706 | 3/1986 | Breed | 280/734 |
| 4,620,721 | 11/1986 | Scholz et al. | 280/735 |
| 4,625,329 | 11/1986 | Ishikawa et al. | 382/1 |
| 4,866,418 | 9/1989 | Dobler et al. | 340/669 |
| 4,985,835 | 1/1991 | Sterler et al. | 364/424.05 |
| 5,058,921 | 10/1991 | Cuevas | 280/736 |
| 5,071,160 | 12/1991 | White et al. | 280/735 |
| 5,118,134 | 6/1992 | Mattes et al. | 280/735 |
| 5,119,901 | 6/1992 | Buie | 180/274 |
| 5,145,208 | 9/1992 | Hoagland et al. | 280/734 |
| 5,152,550 | 10/1992 | Hoagland et al. | 280/737 |
| 5,232,243 | 8/1993 | Blackburn et al. | 280/735 |
| 5,240,283 | 8/1993 | Kishi et al. | 280/729 |
| 5,256,904 | 10/1993 | Tohbaru | 307/10.1 |
| 5,261,506 | 11/1993 | Jost | 180/282 |
| 5,282,646 | 2/1994 | Melvin et al. | 280/729 |
| 5,291,014 | 3/1994 | Brede et al. | 280/735 |
| 5,366,241 | 11/1994 | Kithil | 280/735 |
| 5,468,013 | 11/1995 | Gille | 280/735 |
| 5,510,989 | 4/1996 | Zabler et al. | 364/424.05 |

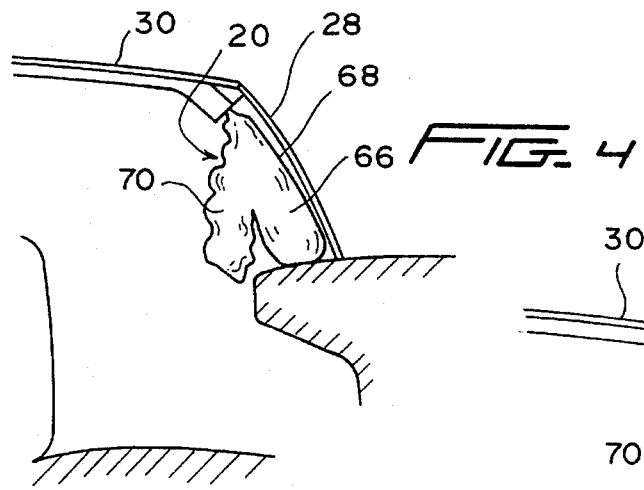
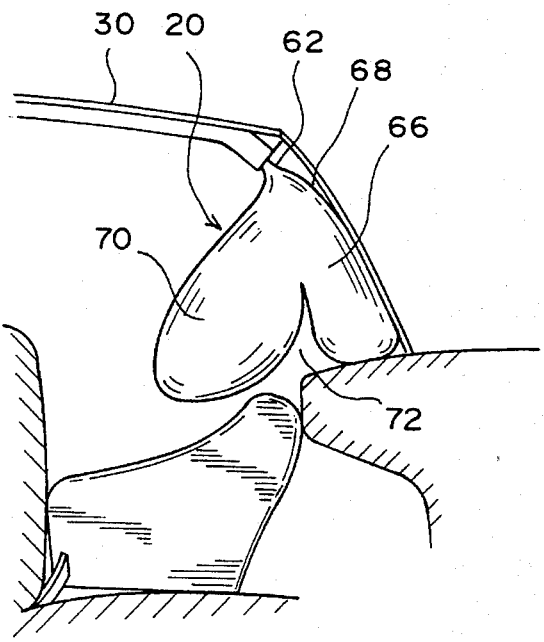
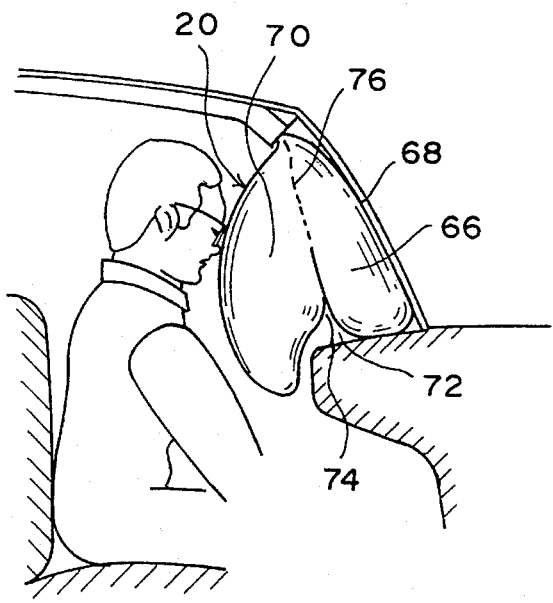

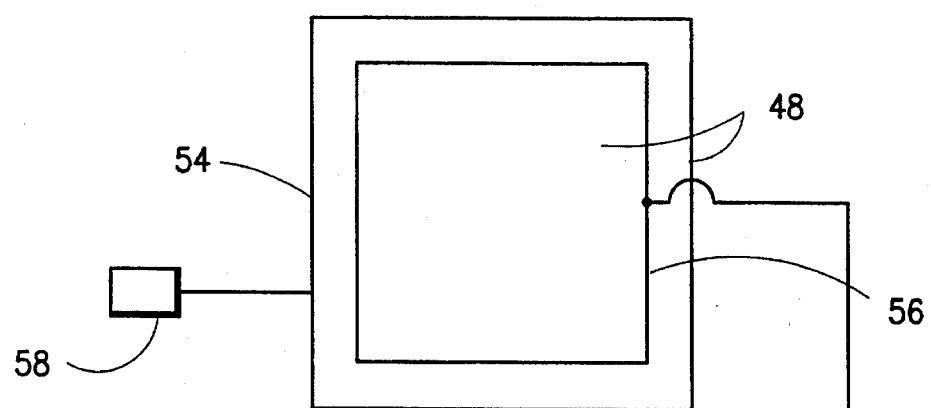
FIG. 7
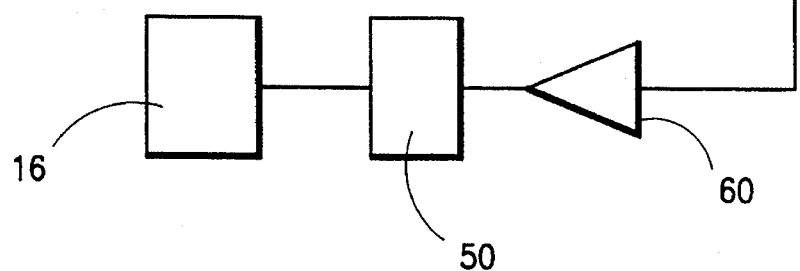
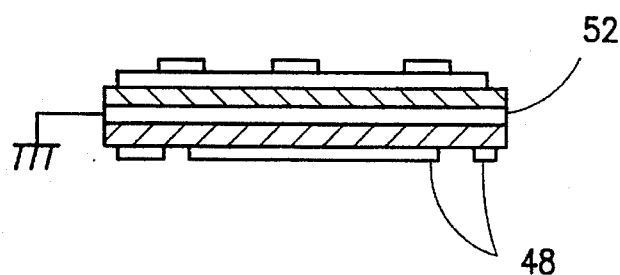
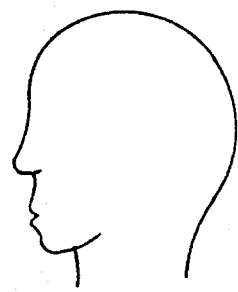
FIG. 8

AUTOMOBILE AIR BAG SYSTEMS

BACKGROUND OF THE INVENTION

The present invention concerns systems for deployment of air bags during vehicle crashes. More particularly it concerns systems in which the system operation is affected not only by information about the motion of the vehicle caused by crash forces, including angular acceleration, but also measured data concerning the motion of the passenger, so that the system will operate in a manner to minimize the risk of serious injury to the passenger, and will not operate when the air bag deployment would not likely be beneficial.

Automobile air bag systems are a well known means of attempting to reduce the likelihood of serious injury to passengers in collisions. These systems are designed to very quickly inflate an air bag in front of a passenger during a collision, so as to hopefully prevent the passenger from colliding with hard objects in the passenger compartment interior, particularly the steering column and/or the dashboard. Such systems typically sense that the vehicle is involved in a collision, by using an accelerometer to sense sudden deceleration of the vehicle. Rapid inflation of the air bag may be obtained by electrical ignition of a pyrotechnic substance which rapidly generates a volume of gas sufficient to inflate the air bag, or by electrical opening of a valve for release of compressed gas stored in a chamber which is part of the air bag system.

The performance of an air bag system, in terms of its success or failure in preventing serious passenger injury, may be critically dependent on facts concerning the initial position and subsequent motion of the passenger, which are not made known to the system by an accelerometer which senses deceleration of the vehicle as a whole. Passenger head motion is particularly important, due to the seriousness of head injuries. For example, if the passenger is seated too far forward, or has his/her head too far forward, occupying the space into which the air bag will deploy, the passenger may be seriously injured by the deployment of the air bag intended to prevent passenger injury. So there is clearly a need for passenger position sensing apparatus, which can prevent air bag deployment when the passenger is already too far forward when the collision begins.

But even if the passenger is not too far forward at the beginning of the collision, the passenger will tend to move rapidly forward, with the passenger's head leading that motion, relative to the vehicle, as the vehicle rapidly decelerates, and will tend to move into the air bag deployment space, at least in the case of forward collisions, and may be too far into the air bag deployment space, before the completion of air bag deployment, to escape injury from the air bag deployment. There are a number of factors which may strongly influence the forward motion of the passenger, in addition to initial position, in ways which may vary markedly from one passenger to another. The relative forward motion of the passenger will depend strongly on whether the passenger has secured a seat lap belt and/or shoulder harness prior to the collision. The passenger's motion may also be influenced somewhat by the strength of any tensing up reaction the passenger has to the collision, i.e. instinctively pushing forward with the feet against the floorboard to restrain forward motion of the body. Such a protective reaction may vary greatly from one passenger to another, and may be greatly reduced or wholly absent if the collision is too sudden, so that the passenger has no time to react, or if the passenger is intoxicated or otherwise impaired. Also variation of the crash intensity by itself will cause considerable variation in passenger acceleration. So there is a need for systems which measure the position vs. time of the passenger, particularly head motion, and analyze that information in making the yes or no decision on air bag deployment. Although systems are known which measure passenger motion, as described in documents filed with applicant's Information Disclosure Statement, applicant is not aware of such a system employing an overhead array of capacitive coupling proximity sensors, as in the present invention, to continuously determine passenger position by triangulation, and determine passenger acceleration by means of a microprocessor which analyzes signals indicative of passenger distance from each sensor of the array, and changes of said distances with time. Overhead sensors offer an advantage over those previously known systems having beam-emitting sensors located in front of the passenger, as in air bag systems with acoustic sensors mounted on the steering column, for which the beam from the sensor will at times by blocked from operating by the hands and/or forearms of the driver.

The use of an array of capacitive coupling proximity sensors offers advantages over beam-emitting sensors, in an air bag system, since each capacitive coupling sensor functions by sensing the change in the capacitance of a capacitor, caused by the nearby presence of a person, an effect which is essentially instantaneous (since propagated at light speed), rather than requiring a finite, non-negligible beam travel time as in the case of an ultrasonic position sensor, and since the capacitive coupling sensor does not require transmission and detection of a beam which might be blocked. And the use of the overhead array of capacitive coupling proximity sensors, the signals from which are analyzed by the microprocessor, allows essentially instantaneous and continuous monitoring of passenger position and motion through triangulation based on the distances of the passenger to the various sensors of the array, so that the overhead sensor array can be used to accurately and continuously determine fore-aft, diagonal, and lateral passenger motion. Since the passenger's head will be closest to the overhead sensors, this method will be particularly sensitive to passenger head motion.

The present invention also addresses a need for an air bag system sensitive to angular vehicle acceleration, for both crash confirmation purposes and also to prevent air bag deployment in the case of a vehicle rollover, in which case air bag performance may be unreliable and deployment is undesirable. This need is met through use of a three axis vehicle rollover sensor, the output of which is analyzed by the microprocessor.

The present invention also addresses a need for an air bag system that will provide protection against injury of a forwardly positioned passenger, which might otherwise be caused by the air bag deployment, in particular an infant sitting in a conventional rear-facing infant car seat, conventionally positioned with the child's head rather far forward, where the child may suffer a serious head injury during air bag deployment. As detailed below, this need is met by the provision of an air bag which, when inflated and deployed, has two principal chambers with a reentrant slot between them, which slot can accommodate the infant in the car seat, and which geometry allows deflection of the rearmost of the two chambers by the car seat and infant, to reduce the force of impact with the passenger and thus reduce the risk of such an injury.

Since the design of automotive air bag systems continues to evolve, as more knowledge is gained about the dynamics of crashes, including problems associated with variations in passenger motion during a crash, there is a need, for crash investigation purposes, for a system which can record the vehicle and passenger motion during the crash process, particularly passenger head motion. This need is met by the present invention, through the provision of recording means in the microprocessor connected to the sensors which detect vehicle and passenger motion.

SUMMARY OF THE INVENTION

The present invention is a roof-mounted motor vehicle air bag system, having, as principal components: a roof-mounted array of capacitive coupling passenger position sensors, for continuously sensing passenger position, especially head motion, by means of triangulation analysis of distances from the passenger to various sensors of the array; a rollover sensor for continuously monitoring all three vehicle axis orientations; a microprocessor, for analysis and brief recording of outputs of the passenger position and rollover sensors, and generation of a signal for air bag deployment, also having in its memory several data bases which are tables of values representative crash-related parameters, further described below; a pyrotechnic gas generator means for air bag inflation, upon receipt of the firing signal from said microprocessor; and a multi-chamber air bag, intended for passenger use (though the other components of the present invention could also be used with driver, side, or rear seat air bag systems), having two principal chambers, separated by a reentrant reaction surface, with one chamber positioned for deployment, on inflation, along the inner surface of the vehicle windshield, and the other principal chamber deploying to the rear of the first, and with the rear most of the two chambers being deflectable by a forwardly positioned occupant such as an infant in a rear-facing child car seat of the kind customarily placed in a forward position, which car seat would lie within the slot formed by reentrant reaction surface, to reduce the risk of passenger injury from air bag deployment. The passenger position sensors are proximity sensors, which are capacitors with associated circuitry to continuously monitor the effect on the capacitance value caused by the presence of a person in the vicinity, which effect is dependent on the distance from the person to the sensor. By use of an oscillator and signal processing circuitry the preferred embodiment monitors the changes in the capacitive coupling effect with suitable sampling frequency, so that the array can be used to measure movement of a passenger. The microprocessor is programmed to deploy the air bag if the sensor data, as compared with a crash confirmation data base table, indicates a crash (this data base table contains data, for comparison purposes, on normal motion which would not be indicative of a crash, e.g. head motion from a sneeze); however the microprocessor is programmed to not issue a firing signal if either: comparison of occupant position and velocity data from the passenger position sensor array, with "no fire" data base figures in tables showing air bag position during deployment, indicates that the occupant would interfere with the deploying air bag; or if a likely vehicle rollover is indicated by the microprocessor's comparison of data from the rollover sensor with tables of values indicating a vehicle rollover, or if data from the rollover sensor indicates that angular vehicle acceleration is insufficient to indicate a collision; or the sensor data indicates that the passenger's motion would not be restrained by the air bag, because of the direction of motion of the passenger caused by the crash, e.g. in a crash with substantial lateral crash force components, causing substantial lateral passenger motion.

BRIEF DESCRIPTION OF THE DRAWINGS

FIG. 4 is a side elevational view showing the air bag in a partially inflated configuration.

FIG. 5 is a side elevational view showing the air bag in a fully inflated configuration, and also showing a rear-facing infant car seat.

FIG. 6 is a side elevational view showing the air bag in a fully inflated configuration, and also showing an adult passenger, FIG. 7 shows the detector element and also schematically shows the signal processing circuit, which together form one of the proximity sensors of the preferred embodiment.

FIG. 8 shows a side elevational view of one of the proximity sensors, above the head of a passenger.

DESCRIPTION OF THE PREFERRED EMBODIMENT

Figure 1:
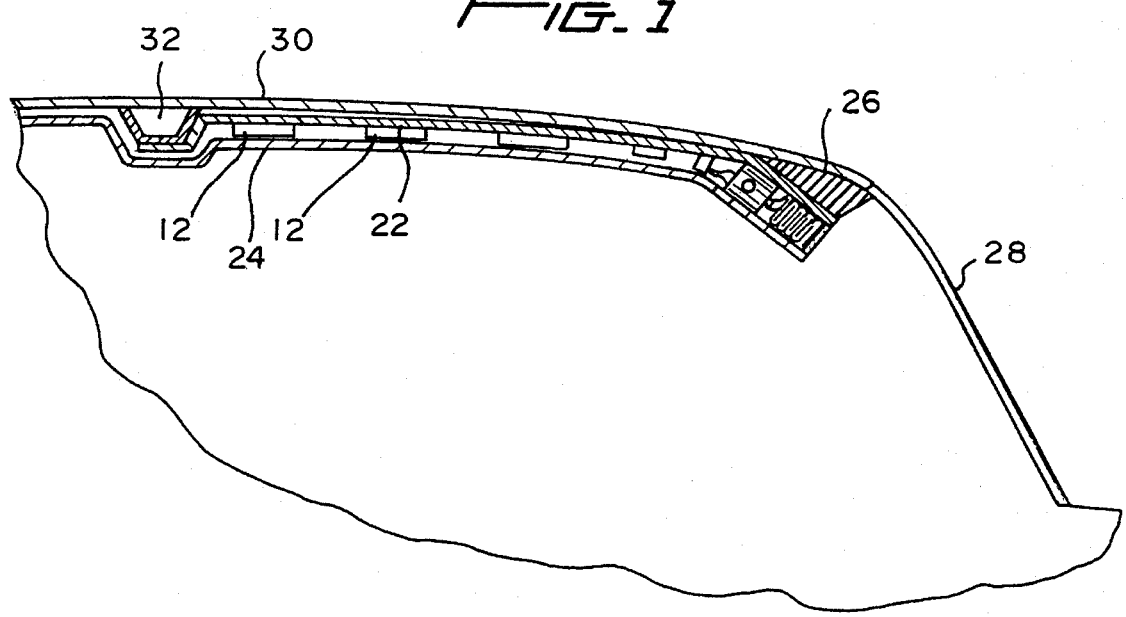
FIG. 1 is a side elevational view of the system of the present invention, partially in section.

Referring now to the drawings, in which like reference numbers denote like or corresponding elements, the principal components of the roof-mounted air bag system of the present invention, are a position sensor array 10 of capacitive coupling proximity sensors 12, a rollover sensor 14, a microprocessor 16, a gas generator means 18, and an air bag 20, each further discussed below.

The components of the system are attached to a mounting plate 22 above the headliner 24 which is held in place against the passenger cabin roof by edge molding, adhesives, and/or fasteners. The mounting plate 22 is secured by bolts or other secure attachment means at its front end, to the windshield header 26, a part of the vehicle used to attach the windshield 28 to the forward edge of the vehicle roof 30. The mounting plate 22 is firmly secured at its rear end, e.g. by bolts or welding, to a cross brace 32, a standard brace which extends transversely across the interior of vehicle roof 30.

Figure 3:
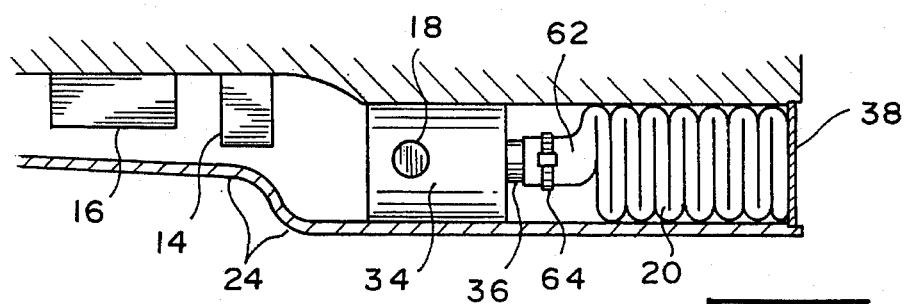
FIG. 3 is an expanded view of the portion of FIG. 1 showing the folded air bag, prior to deployment.

The gas generator means 18 is housed within a manifold 34, which manifold is firmly secured, e.g. by bolts or welding, to mounting plate 22. The gas generator means 18 conveys gas to air bag 20 through a gas nozzle 36. As shown in FIG. 3, air bag 20 is compactly folded above headliner 24, when not inflated and deployed. The headliner 24 has a thin breakaway or door portion 38 below air bag 20, to allow deployment of air bag 20 during a collision.

The proximity sensors 12 forming the position sensor array 10 may be attached to mounting plate 22, or embedded in headliner 24.

The rollover sensor 14, adjacent to position sensor array 10, is securely attached, e.g. by screws, to mounting plate 22. The microprocessor 16 is also securely attached to mounting plate 22. Electric power for operation of microprocessor 16, may be obtained by running wires 40 down one of the A-pillars 42, as shown, or alternatively by running the wires 40 to the dome lamp (not shown). A backup power supply may be a battery 44 and/or a capacitor 46, also attached to mounting plate 22. The air bag system is covered by headliner 24, which is an insulating and cosmetic material such as foamboard, urethane composites, etc., which is securely attached by adhesive or by edge moulding structures or other secure means to the inner surface of vehicle roof 30, and to mounting plate 22.

Figure 2:
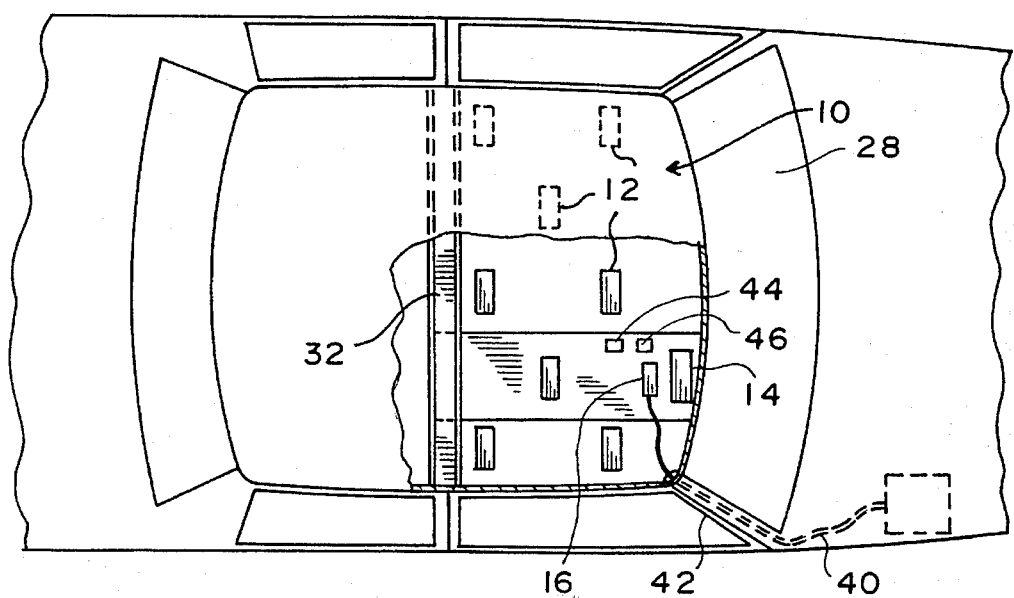
FIG. 2 is a plan view, showing the array of capacitive coupling proximity sensors.

Each of the proximity sensors 12 consists of both a detector element 48, and a signal processing circuit 50, which are best illustrated in FIG. 7. The detector element 48 consists of at least two conductors on one side of a printed circuit board 52, shown in the particular embodiment of FIG. 7 as an oscillator input loop 54, and detector output loop 56. The proximity sensors 12 each function by creating an electrostatic field between oscillator input loop 54 and detector output loop 56, which is affected by presence of a person near by, as a result of capacitive coupling, due to the fact that the human body has conductivity and a dielectric constant different from those of air. Thus there is a change in the capacitance between oscillator input loop 54 and detector output loop 56, caused by the presence of a person nearby. As is well known in the electronic arts, such a capacitive coupling effect will be dependent on the distance from the person to sensor 12. The measured capacitance change may thus be used to determine the distance of the person from sensor 12. The purpose of the signal processing circuit 50, with oscillator 58 and charge-sensitive amplifier 60, is simply to continuously monitor the capacitive coupling effect, and changes in the magnitude of the effect, so that the microprocessor 16 will continuously receive signals from each of the proximity sensors 12, indicative of passenger position. The signals will be particularly sensitive to passenger head position and head motion, since the head is closest to the overhead position sensor array 10. The oscillator 58 is operated at a frequency of the order of 100 kHz, and signal processing circuit 50 will sample at 10 kHz, which is adequate for continuous rapid sampling of the capacitive coupling effect, and changes therein. The sampling rate for signal processing circuit 50 may be determined by means contained within microprocessor 16, such as a conventional analog digital converter circuit. The signal processing circuit 50 may consist of a conventional full wave rectifier and a conventional peak detector, connected in series. The position sensor array 10 is an array of the proximity sensors 12 having both longitudinal and lateral extension, as best shown in FIG. 2. An array of one detector every 6" to 12" is believed to be suitable, i.e. the array above a passenger consisting of 4 to 8 detectors depending on the vehicle. An array for bench seats may require more detectors than an array for bucket seats, due to greater variation in occupant position in the seat. The array is used for passenger position determination, as explained below.

The rollover sensor 14 is an electronic 3-axis compass, having three electrical outputs indicative of rotation of rollover sensor 14 about each of its axes. The output signals from rollover sensor 14 are sent to inputs of microprocessor 16 by wires (not shown), so that microprocessor 16 may continuously analyze data regarding components of angular vehicle acceleration.

The microprocessor 16 is programmed to perform the following functions. At startup of the vehicle ignition, which turns on power to microprocessor 16, the microprocessor 16 turns on power to each of the proximity sensors 12 of position sensor array 10, and to rollover sensor 14. The microprocessor 16 continuously monitors the distance of the effective electronic center of a passenger from each of proximity sensors 12, by comparing the capacitive coupling effect produced in each of proximity sensors 12, with a lookup table containing capacitive coupling effect correlations to distance, stored in the memory of the microprocessor 16. By triangulation from the distances of the passenger to the three closest proximity sensors 12 of position sensor array 10, the microprocessor 16 continuously computes and updates the passenger position, as the output signals from each of proximity sensors 12, continuously driven by oscillator 58, are continuously received and analyzed by microprocessor 16. The memory of microprocessor 16 is of a size sufficient to contain the most recent 50,000 passenger positions, corresponding to about 5 seconds of sensing (at the 10 kHz. sampling frequency of oscillator 58), after which newer data overwrites previously recorded data. Thus the microprocessor 16 will contain a detailed record of passenger position during the last 5 seconds before a crash, and will continue to record data for 5 seconds after the crash, which will be quite useful for later crash analysis purposes. Air bag deployment will stop the erasure of old data.

The microprocessor 16 memory also contains passenger head motion lookup tables of threshold acceleration values which may be used to distinguish lesser acceleration motions which often occur in non-collision conditions, e.g. head motion from a sneeze.

The microprocessor 16 is programmed to make a preliminary decision for deployment of air bag 20, if 30–50 or more successive passenger position data points in the memory show an increasing passenger acceleration, and if comparison of this passenger motion data with the parameters in the passenger motion crash parameter lookup tables, indicates a collision. However, the microprocessor 16 is also programmed to override the preliminary decision for air bag deployment, under several different and alternative circumstances:

The microprocessor 16 also simultaneously computes the projected passenger motion during air bag deployment, using the same 30–50 most recent passenger position data points, and thus determines the likely average position of the passenger during the early expansion phase of air bag deployment. The microprocessor 16 compares this position to a "no fire" lookup table contained in the memory of the microprocessor, containing representative positions (three dimensional coordinates) which would be occupied by air bag 20 after initiation of deployment, during its early expansion phase, i.e. from the initial stored position until air bag 20 has extended down to the top of the dashboard (passenger air bag) or to the midpoint of the steering wheel (driver air bag).

The microprocessor 16 is programmed to override the preliminary decision for air bag deployment, if the projected average passenger position during air bag deployment is within the "no fire" zone, or too close—within some chosen safety margin distance.

The microprocessor 16 also continuously samples the signals from the rollover sensor 14, reflecting rotation of the x, y, or z vehicle axes. The rollover sensor 14 transmits this data to microprocessor 16 at a rate of 5 kHz. and this data is sampled and recorded at a rate of about 20%, or 1 data point per millisecond. The microprocessor 16 is programmed to override an initial decision for air bag deployment, based on analysis of the signals from rollover sensor 14, in two situations. First, the angular acceleration data for the sampled data points, is compared with data stored in the memory of microprocessor 16 in a "rollover therefore cancel" lookup table, which table has values of axial accelerations indicative of a vehicle rollover. If this comparison indicates that the vehicle will likely roll over from the present collision, air bag deployment is cancelled, because air bag performance is unpredictable and possibly harmful in a vehicle rollover; for instance, the occupant could be propelled into the roof rather than forward into the steering wheel or dashboard. Second, the same data points of angular acceleration are compared with a "crash confirmation" table stored in the memory of microprocessor 16, having minimum values of angular accelerations which are indicative of true collisions. If the angular acceleration for the three axes is less than these lookup table values, air bag deployment is cancelled. In other words, at least one of the measured angular accelerations must exceed the corresponding minimum value in order for deployment to occur.

If the preliminary decision for air bag deployment is not overridden by the microprocessor 16, in one of the ways explained above, the microprocessor 16 initiates deployment of air bag 20, by sending an electrical signal to the gas generator means 18.

The gas generator means 18 is a means to rapidly generate a large volume of gas for inflation of air bag 20, in response to an electrical signal from microprocessor 16. Preferably this is accomplished through ignition by squibs (not shown), triggered by the firing signal from microprocessor 16, of a pyrotechnic gas generation mixture contained within two gas generator chambers connected to air bag 20 by a single gas nozzle 36. The inflation of air bags by gas generated through burning of pyrotechnic mixtures, which may be ignited electrically by one or more squibs, is an air bag inflation method well known in the art, as described for example in the patent on the invention of Cuevas, U.S. Pat. No. 5,058,921, describing combustion chambers 32 and 34 containing a mixture of sodium azide and copper oxide, ignited by a squib 36. Col. 6, lines 56–68; FIG. 2; Col. 7, lines 37–41; and the patent on the invention of White et al, U.S. Pat. No. 5,071,160, describing air bag inflation by a plurality of pyrotechnic-activated gas generating cartridges 44. Col. 5, lines 22–37. Said disclosures of said patents are incorporated herein by this reference.

The air bag 20 of the present invention is a multi-chamber air bag having a deployed configuration which is intended to reduce the risk of serious injury to a forwardly positioned passenger, specifically including an infant who may be forwardly positioned in a conventional rear-facing child car seat. The design also provides enhanced cushioning effects to reduce the risk of occupant injury.

The air bag 20 has a first chamber 62, forming a neck which extends around gas nozzle 36, to which first chamber 62 is securely attached by a suitable clamp 64, or other suitable attachment means. The air bag 20 is configured to form, on inflation, two principal chambers, a forward chamber 66, which inflates downward with its forward surface 68 extending downward along windshield 28, and a rear chamber 70. A reentrant notch 72, of the form of an inverted V, is formed by a reentrant reaction surface 74, the portion of the surface of air bag 20 joining forward chamber 66 and rear chamber 70. The reentrant notch 72 is maintained, against the tendency of the gas pressure to erase it by forcing downward the juncture between forward chamber 66 and rear chamber 70, by means of an tether 76 within air bag 20, which attaches the top of air bag 20 to the juncture between forward chamber 66 and rear chamber 70.

This geometry tends to reduce the risk of injury to an infant in a rear-facing car seat, or other forwardly positioned passenger, since this passenger can fit within notch 72 between forward chamber 66 and rear chamber 70, and since the body of a forwardly positioned passenger, even if sufficiently far back as to be struck by rear chamber 70, can deflect rear chamber 70 upward, so as to reduce the impact on the passenger from the collision with the air bag 20.

The air bag design also provides an enhanced cushioning effect, since there is a sequential flow of the gas from first chamber 62, to forward chamber 66 and thence to rear chamber 70. Gas may be vented through one or more orifices (not shown) in air bag 20, or if a porous fabric is used in fabrication of air bag 20, some of the gas may seep out of the pores, thereby providing a soft cushioning effect.

Those familiar with the art will appreciate that the invention may be employed in configurations other than the specific forms disclosed herein, without departing from the essential substance thereof.

For example, and not by way of limitation, other forms of capacitive coupling proximity sensors could be used, other than the specific form disclosed herein, provided only that the sensor element has a capacitance between two of its electrodes, and that the sensor circuit is able to measure changes in said capacitance caused by capacitive coupling effects of the head of the passenger. Or the means for calculating passenger position and acceleration could use the elements disclosed in applicant's prior patent application no. 08/130,089, filed Sep. 30, 1993, entitled "AUTOMOBILE AIR BAG SYSTEM", e.g. at page 11, line 25–page 12, line 10.

It would of course not be necessary to use a squib-fired pyrotechnic mixture for the gas generation means; one could instead employ a pressurized gas container, with an electrically operated valve activated by a firing signal from the microprocessor.

Similarly the invention is not to be regarded as being limited to any particular choices of the spacing dimensions of the proximity sensors 12 in position sensor array 10; or of the sensor operating rates or sampling rates; or of mounting methods inside headliner 24, or particular methods of attachment to the roof structure; or to the use of a particular vehicle linear accelerometer as part of the crash confirmation process, such as Analog Devices ADXL50, rather than the 3 axis angular accelerometer.

The scope of the invention is defined by the following claims, including also all subject matter encompassed by the doctrine of equivalents as applicable to the claims.

I claim:

1. Motor vehicle air bag system, for inflation and deployment of an air bag in front of a passenger in a motor vehicle during a collision, said motor vehicle having a passenger compartment for at least one passenger in said motor vehicle, said passenger compartment also having an interior roof, and having a windshield at the forward end of said passenger compartment, and having a passenger seat for said passenger, said air bag system comprising:

(a) an air bag;

(b) inflation means, connected to said air bag, for inflating said air bag with a gas;

(c) passenger sensor means, for continuously sensing position of said passenger, with respect to said passenger compartment, and for generating electrical output indicative of said position of said passenger;

(d) vehicle angular orientation sensor means, for sensing angular orientation of said vehicle, and for generating electrical output indicative of said angular orientation of said vehicle; and (e) microprocessor means, electrically connected to said passenger sensor means, to said vehicle angular orientation sensor means, and to said inflation means, for comparing and performing an analysis of said electrical outputs from said passenger sensor means and said vehicle angular orientation sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag and likely would not present an increased risk of injury to said passenger resulting from deployment of said air bag.

2. The motor vehicle air bag system of claim 1, wherein said air bag is mounted near said interior roof of said vehicle.

3. The motor vehicle air bag system of claim 1, wherein said passenger sensor means comprises an array of passenger proximity sensor means, for sensing distance from a passenger to each of said passenger proximity sensor means, and wherein said microprocessor means includes means for determining passenger position by determining each of said distances, and further includes means for triangulation analysis of the distances from said passenger to each of said passenger proximity sensor means, to determine the position of said passenger.

4. The motor vehicle air bag system of claim 3, wherein each of said passenger proximity sensor means comprises a capacitor, and a circuit means, connected to said capacitor, for continuously sensing the capacitive coupling effect on the capacitance of said capacitor, caused by the presence of said passenger in said passenger compartment, and for continuously providing a signal to said microprocessor means, indicative of the value of said capacitance; and wherein said microprocessor means includes means for continuously determining the distance of said person from each of said passenger proximity sensor means, based upon the value of said capacitance.

5. The motor vehicle air bag system of claim 1, wherein said passenger sensor means is mounted adjacent to said interior roof of said vehicle.

6. The motor vehicle air bag system of claim 1, wherein said vehicle angular orientation sensor means is a means for sensing said angular orientation of said vehicle with respect to each of three mutually perpendicular axes.

7. The motor vehicle air bag system of claim 6, wherein said vehicle angular orientation sensor means is a three axis electronic compass.

8. The motor vehicle air bag system of claim 1, wherein said microprocessor means includes memory means for storing said positions of said passenger over some interval of time, and for storing said angular orientations of said vehicle over some interval of time, and for storing crash reference data regarding passenger acceleration and vehicle angular acceleration indicative of vehicle collisions, and regarding positions which will be occupied by said air bag during deployment of said air bag, and regarding angular vehicle acceleration indicative of vehicle rollover.

9. The motor vehicle air bag system of claim 8, wherein said microprocessor means includes means to (a) make a preliminary decision to activate said inflation means to inflate and deploy said air bag, if comparison of said passenger positions over a specified period of time, by said microprocessor means, indicates increasing acceleration of said passenger relative to said passenger compartment, and if comparison of said passenger acceleration with said crash reference data regarding passenger acceleration, indicates that the vehicle is involved in a collision;

(b) compute a projected average position of said passenger during the early phase of deployment of said air bag;

(c) override said initial decision for deployment of said air bag, if comparison of said projected average position of said passenger during said early phase of deployment of said air bag, with said crash reference data on positions which would be occupied by said air bag during deployment of said air bag, indicates that said passenger will be in a position to be occupied by said air bag;

(d) override said initial decision for deployment of said air bag, if comparison of said angular orientations of said vehicle, over a specified period of time, by said microprocessor means, indicates angular vehicle acceleration which, when compared by said microprocessor means with said crash reference date regarding angular acceleration indicative of a vehicle collision, indicates that said vehicle is not involved in a collision;

(e) override said initial decision for deployment of said air bag, if comparison of said angular vehicle acceleration with said crash reference data on vehicle rollovers, indicates that said vehicle will roll over; and (f) activate said inflation means to inflate and deploy said air bag, if said preliminary decision for air bag deployment is made and is not overridden under the processes indicated in parts (b) through (e) of this claim.

10. The motor vehicle air bag system of claim 1, wherein said inflation means comprises: at least one chamber containing an inflammable pyrotechnic composition, and at least one squib means, electrically connected to said microprocessor means, for ignition of said pyrotechnic composition, with each said chamber being connected to said air bag.

11. The motor vehicle air bag system of claim 1, wherein said inflation means comprises: at least one chamber containing a pressurized gas, having an electrically operated release valve connected to said air bag, with said release valve being electrically connected to said microprocessor means.

12. Motor vehicle air bag system, for inflation and deployment of an air bag in front of a passenger in a motor vehicle during a collision, said motor vehicle having a passenger compartment for at least one passenger in said motor vehicle, said passenger compartment also having an interior roof, and having a windshield at the forward end of said passenger compartment, and having a passenger seat for said passenger, said air bag system comprising:

(a) an air bag;

(b) inflation means, connected to said air bag, for inflating said air bag with a gas;

(c) passenger sensor means, mounted adjacent to said interior roof of said vehicle, for continuously sensing position of said passenger, with respect to said passenger compartment, and for generating electrical output indicative of said position of said passenger;

(d) microprocessor means, electrically connected to said passenger sensor means and to said inflation means, for comparing and performing an analysis of said electrical output from said passenger sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag and likely would not present an increased risk of injury to said passenger resulting from deployment of said air bag.

13. The motor vehicle air bag system of claim 12, wherein said passenger sensor means comprises an array of passenger proximity sensor means, for sensing distance from a passenger to each of said passenger proximity sensor means, and wherein said microprocessor means includes means for determining passenger position by determining each of said distances, and further includes means for triangulation analysis of the distances from said passenger to each of said passenger proximity sensor means, to determine the position of said passenger.

14. The motor vehicle air bag system of claim 13, wherein each of said passenger proximity sensor means comprises a capacitor, and a circuit means, connected to said capacitor, for continuously sensing the capacitive coupling effect on the capacitance of said capacitor, caused by the presence of said passenger in said passenger compartment, and for continuously providing a signal to said microprocessor means, indicative of the value of said capacitance; and wherein said microprocessor means includes means for continuously determining the distance of said person from each of said passenger proximity sensor means, based upon the value of said capacitance.

15. The motor vehicle air bag system of claim 12, wherein said microprocessor means includes memory means for storing said positions of said passenger over some interval of time.

16. The motor vehicle air bag system of claim 15, wherein said microprocessor means includes means to (a) make a preliminary decision to activate said inflation means to inflate and deploy said air bag, if comparison of said passenger positions over a specified period of time, by said microprocessor means, indicates increasing acceleration of said passenger relative to said passenger compartment, and if comparison of said passenger acceleration with said crash reference data regarding passenger acceleration, indicates that the vehicle is involved in a collision;

(b) compute a projected average position of said passenger during the early phase of deployment of said air bag;

(c) override said initial decision for deployment of said air bag, if comparison of said projected average position of said passenger during said early phase of deployment of said air bag, with said crash reference data on positions which would be occupied by said air bag during deployment of said air bag, indicates that said passenger will be in a position to be occupied by said air bag; and (d) activate said inflation means to inflate and deploy said air bag, if said preliminary decision for air bag deployment is made and is not overridden under the processes indicated in parts (b) and (c) of this claim.

17. The motor vehicle air bag system of claim 15, wherein said microprocessor means includes means to determine a projected trajectory of motion of said passenger, and to block deployment of said air bag if said projected trajectory indicates that said passenger would move in a direction such as to miss said air bag if said air bag were deployed.

18. The motor vehicle air bag system of claim 12, wherein said passenger sensor means is a means particularly sensitive to the position of the head of said passenger.

19. The motor vehicle air bag system of claim 12, further comprising means to determine linear acceleration of said vehicle, and wherein said microprocessor means further comprises means to perform an analysis of said linear acceleration over time, and to prevent deployment of said air bag if said analysis of said linear acceleration indicates that said vehicle is not involved in a collision.

20. The motor vehicle air bag system of claim 16, further comprising means to determine linear acceleration of said vehicle, and wherein said memory means includes means to store values of said linear acceleration of said vehicle over some interval of time, and wherein said microprocessor means further comprises means to perform an analysis of said linear acceleration over time, and to override said initial decision for deployment of said air bag if said analysis of said linear acceleration indicates that said vehicle is not involved in a collision.

21. Motor vehicle air bag system, for inflation and deployment of an air bag in front of a passenger in a motor vehicle during a collision, said motor vehicle having a passenger compartment for at least one passenger in said motor vehicle, said passenger compartment also having an interior roof, and having a windshield at the forward end of said passenger compartment, and having a passenger seat for said passenger, said air bag system comprising:

(a) an air bag, mounted near said interior roof of said vehicle, said air bag having two principal chambers, a forward chamber and a rear chamber, and having means for gas to flow sequentially from said forward chamber to said rear chamber, said air bag being so configured that, upon inflation, said forward chamber deploys downward along said windshield, and said rear chamber deploys to the rear of said forward chamber, and said air bag having a surface having a reentrant portion forming a notch at the bottom of said air bag, upon inflation of said air bag, with said notch being located between said forward chamber and said rear chamber, and wherein said notch is of sufficient size to accommodate at least a substantial portion of the body of a passenger positioned at the location of said notch;

(b) inflation means, connected to said air bag, for inflating said air bag with a gas;

(c) inflation means activation means, for activating said inflation means to inflate said air bag, when said vehicle is involved in a collision and when deployment of said air bag would likely reduce a risk of serious injury to said passenger which would exist absent deployment of said air bag and likely would not present an increased risk of injury to said passenger resulting from deployment of said air bag.

22. The motor vehicle air bag system of claim 21, further comprising means to measure and record positions of said passenger during said collision.

23. The motor vehicle air bag system of claim 22, further comprising means to measure and record angular orientations of said vehicle during said collision.

* * * * *